US009342556B2

(12) United States Patent
Bhatia et al.

(10) Patent No.: US 9,342,556 B2
(45) Date of Patent: May 17, 2016

(54) RDF GRAPHS MADE OF RDF QUERY LANGUAGE QUERIES

(71) Applicant: International Business Machines Corporation, Armonk, NY (US)

(72) Inventors: Anil Bhatia, New Delhi (IN); Sandeep Katoch, Bangalore (IN); Sandeep Kohli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/854,185

(22) Filed: Apr. 1, 2013

(65) Prior Publication Data

US 2014/0297675 A1      Oct. 2, 2014

(51) Int. Cl.
*G06F 17/30* (2006.01)

(52) U.S. Cl.
CPC ...... *G06F 17/30427* (2013.01); *G06F 17/3043* (2013.01)

(58) Field of Classification Search
CPC ............. G06F 17/30427; G06F 17/3043
USPC ................................ 707/760, 769
See application file for complete search history.

(56) References Cited

U.S. PATENT DOCUMENTS

| 7,613,712 | B2* | 11/2009 | Greenblatt et al. | |
|---|---|---|---|---|
| 8,140,556 | B2 | 3/2012 | Rao et al. | |
| 2002/0073086 | A1* | 6/2002 | Thompson et al. | 707/10 |
| 2003/0100996 | A1* | 5/2003 | Yang et al. | 702/19 |
| 2007/0094256 | A1* | 4/2007 | Hite et al. | 707/6 |
| 2007/0094288 | A1* | 4/2007 | Enenkiel | 707/101 |
| 2007/0198456 | A1* | 8/2007 | Betz et al. | 707/1 |
| 2007/0198564 | A1 | 8/2007 | Blackstone et al. | |
| 2008/0040308 | A1 | 2/2008 | Ranganathan et al. | |
| 2008/0256026 | A1 | 10/2008 | Hays | |
| 2009/0193328 | A1* | 7/2009 | Reis et al. | 715/231 |
| 2009/0299646 | A1* | 12/2009 | Shams et al. | 702/19 |
| 2010/0228782 | A1 | 9/2010 | Rao et al. | |
| 2011/0078166 | A1* | 3/2011 | Oliver et al. | 707/760 |
| 2011/0246450 | A1* | 10/2011 | Guzenda | 707/716 |
| 2011/0246671 | A1* | 10/2011 | Guzenda | 709/240 |
| 2011/0296517 | A1* | 12/2011 | Grigoriev et al. | 726/12 |
| 2012/0254102 | A1* | 10/2012 | Li et al. | 706/58 |
| 2013/0041897 | A1* | 2/2013 | O'Donnell et al. | 707/736 |
| 2013/0080461 | A1* | 3/2013 | Byrne et al. | 707/769 |
| 2013/0260358 | A1* | 10/2013 | Lorge et al. | 434/362 |
| 2013/0318070 | A1* | 11/2013 | Wu et al. | 707/722 |
| 2014/0059043 | A1* | 2/2014 | Sundara | G06F 17/30 707/723 |
| 2014/0067793 | A1* | 3/2014 | Shironoshita | 707/718 |
| 2014/0280282 | A1* | 9/2014 | Mizell | 707/760 |

OTHER PUBLICATIONS

Andy Seaborne et al., "SPARQL/Update: A language for updating RDF graphs", Jul. 3, 2007, HP, pp. 1-13.*

(Continued)

*Primary Examiner* — Apu Mofiz
*Assistant Examiner* — Jared Bibbee
(74) *Attorney, Agent, or Firm* — David B. Woycechowsky

(57) ABSTRACT

A method, software and/or computer system for representing a set of SPARQL queries. The set of SPARQL queries are converting into an RDF representation of the set of SPARQL queries (that is, a SPARQL RDF graph). The SPARQL RDF graph is applied to a target RDF graph to yield a transformed target representing the responses to the set of queries, as an ontology or as text.

12 Claims, 3 Drawing Sheets

(56) References Cited

OTHER PUBLICATIONS

Lei Zou et al., "gStore: Answering SPARQL Queries via Subgraph Matching", 2011, pp. 482-493.*

Jiewen Huang et al., "Scalable SPARQL Querying of Large RDF Graphs", 2011, pp. 1-12.*

Maris Jukss et al., "Implementing Graph Transformation Languages using RDF Storage and SPARQL Queries", Aug. 31, 2012, pp. 1-9.*

Cherfi et al., "Semantic Annotation of Texts with RDF Graph Contexts", ICCS Supplement '08, pp. 75-82, 2008, <http://arnetminer.org/publication/semantic-annotation-of-texts-with-rdf-graph-contexts-290341.html; jsessionid=9F6B98A9D538B3F5D073F8CA89237F4E.tt>.

Corby et al., "RDF/SPARQL Design Pattern for Contextual Metadata," 2007 IEEE/WIC/ACM International Conference on Web Intelligence, DOI 10.1109/WI.2007.19, p. 474-477, IEEE Computer Society.

Das et al., "Making Unstructured Data SPARQL Using Semantic Indexing in Oracle Database," 2012 IEEE 28th International Conference on Data Engineering, Oracle, Nashua, NH, USA, DOI 10.1109/ICDE.2012.59, p. 1405-1416, IEEE Computer Society.

Medina et al., "RDF-based Model for Encoding Document Hierarchies," 17th International Conference on Electronics, Communications and Computers (CONIELECOMP'07), © 2007 IEEE.

* cited by examiner

RDF GRAPHS MADE OF RDF QUERY LANGUAGE QUERIES

FIELD OF THE INVENTION

The present invention relates generally to the field of Resource Description Framework (RDF) graphs and languages for querying RDF graphs, and more particularly to organization of multiple SPARQL Protocol and RDF Query Language ("sparql" or "SPARQL") queries to enable transformation of RDF graphs into RDF Graphs or text.

BACKGROUND OF THE INVENTION

The Resource Description Framework (RDF) is a family of World Wide Web Consortium (W3C) specifications. RDF is used as a general method for conceptual description or modeling of information that is implemented in web resources. RDF includes a variety of syntax formats. The RDF data model is largely based upon the idea of making statements about resources (in particular web resources) in the form of subject-predicate-object constructs. These constructs are known as "triples." The subject denotes the resource. The predicate denotes traits, or aspects, of the resource and expresses a relationship between the subject and the object. RDF is an abstract model with several serialization formats (that is, file formats), and so the particular way in which a resource or triple is encoded varies from format to format. A collection of RDF statements intrinsically represents a labeled, directed multi-graph. For this reason, RDF is more suitable for representing certain kinds of knowledge than a relational model and/or other ontological models. Additional ontology languages can be built upon RDF.

Data is often described using RDF graphs. The structure of an RDF graph is commonly described using OWL (Web Ontology Language) and/or RDFS, which is itself described using RDF. RDF graphs that conform to a given specification are created by appropriate tooling. In some cases, an existing non-RDF based system is "captured" into RDF using: (i) adaptors; and (ii) a reciprocal requirement of converting these RDF graphs back into the original form. In this way, analysis can be performed using RDF tools. In some older systems, the system does not understand RDF, and therefore must convert RDF representation back into text in order to use it.

SPARQL is an RDF query language, that is, a query language for databases. SPARQL queries retrieve and manipulate data stored in RDF format. SPARQL queries may include: (i) triple patterns; (ii) conjunctions; (iii) disjunctions; and/or (iv) optional patterns. Implementations for multiple programming languages exist. Some tools translate SPARQL queries to other query languages, for example SQL, XQuery, etc. SPARQL queries generally are unambiguous. In a federated SPARQL query, a SPARQL query is distributed to multiple SPARQL endpoints so that multiple responses can be received and aggregated. SPARQL includes four different query variations for different purposes as follows: (i) SELECT query, used to extract raw values from a SPARQL endpoint, the results are returned in a table format; (ii) CONSTRUCT query, used to extract information from the SPARQL endpoint and transform the results into RDF format; (iii) ASK query, used to provide a simple True/False result for a query; and (iv) DESCRIBE query, used to extract an RDF graph from the SPARQL endpoint. WHERE blocks are often used in these four query forms in order to restrict the query.

SUMMARY

According to an aspect of the present invention, a computer program product includes software for representing a set of Resource Descriptor Framework (RDF) query language queries. The software includes: (i) first program instructions programmed to receive the set of RDF query language queries; and (ii) second program instructions programmed to convert the set of RDF query language queries into an RDF representation of the set of RDF query language queries. The software is stored on a software storage device in a manner less transitory than a signal in transit.

According to a further aspect of the present invention, a computer system represents a set of Resource Descriptor Framework (RDF) query language queries. The computer system includes: a processor set; and a software storage device. The processor set is structured, located, connected and/or programmed to run software stored on the software storage device. The software includes: (i) first program instructions programmed to receive the set of RDF query language queries; and (ii) second program instructions programmed to convert the set of RDF query language queries into an RDF representation of the set of RDF query language queries.

According to a further aspect of the present invention, there is a method for representing a set of Resource Descriptor Framework (RDF) query language queries. The method includes the following steps: (i) receiving the set of RDF query language queries; and (ii) converting the set of RDF query language queries into an RDF representation of the set of RDF query language queries. At least the receiving step and the converting step are performed by a computer.

DETAILED DESCRIPTION

Figure 1:
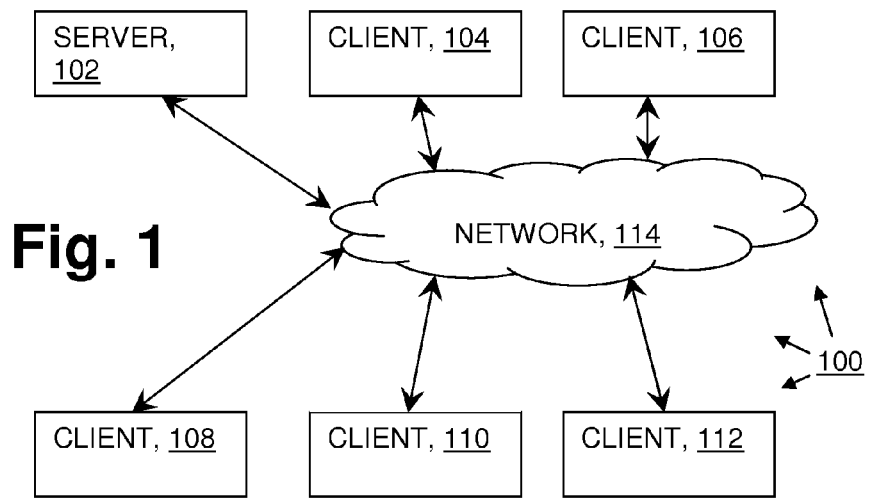
FIG. 1 is a schematic view of a first embodiment of a computer system (that is, a system including one or more data processing devices) according to the present invention.

This DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
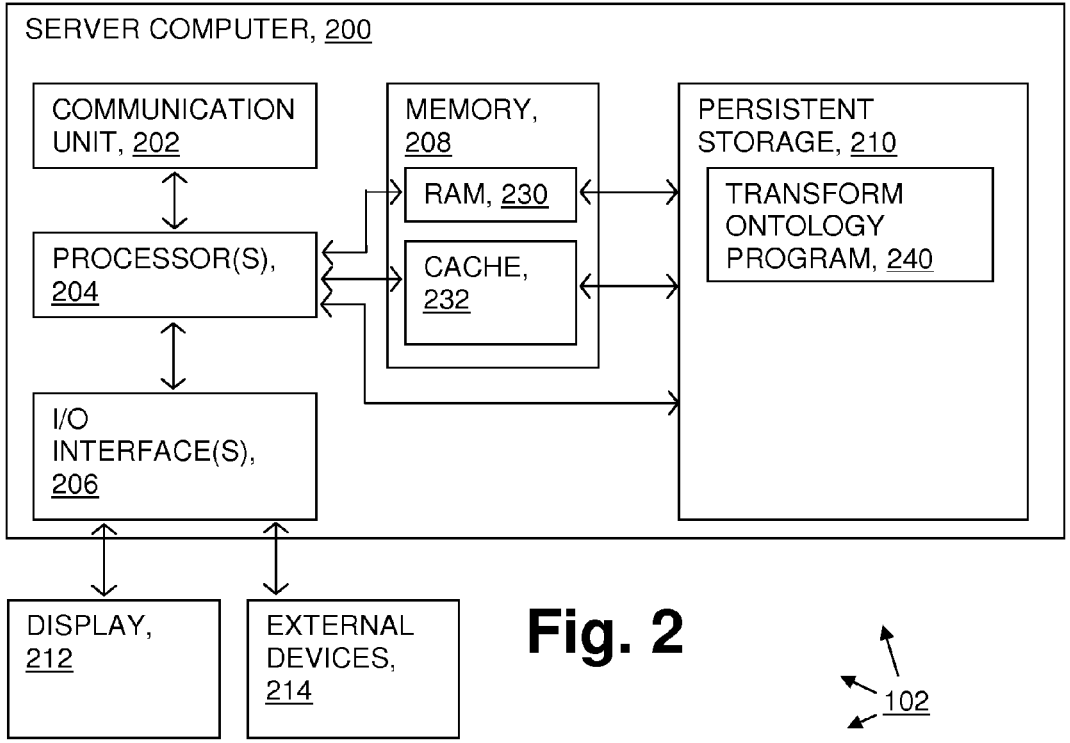
FIG. 2 is a schematic view of a server computer sub-system (that is, a sub-system including a server computer) portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and transform ontology program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Transform ontology program 240 is a representative software module, and is a collection of machine readable instructions and data that is used to create, manage and control certain software functions that will be discussed in detail below.

Server computer sub-system 102 is capable of communicating with other computer sub-systems via network 114 (see FIG. 1). Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory sub-system 102.

Program 240 is in many respects representative of the various software modules of the present invention and is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
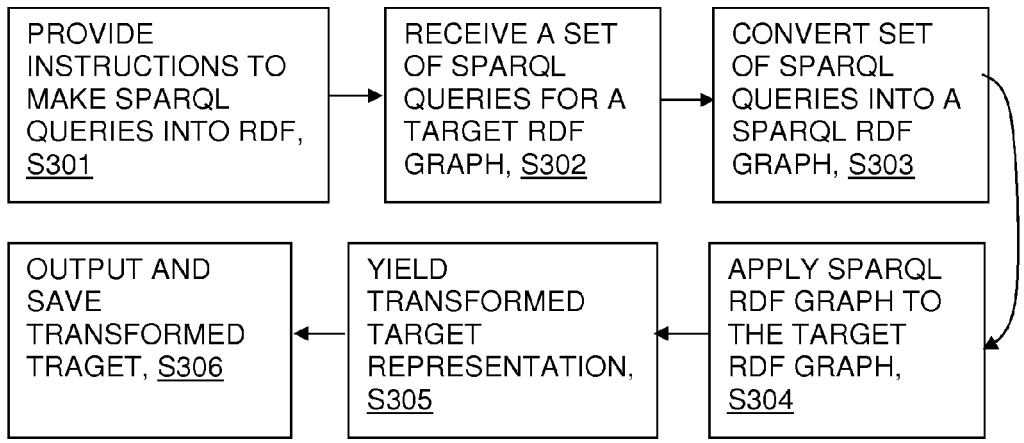
FIG. 3 is a flowchart showing a process according to an embodiment of the present invention, executed, at least in part, by the first embodiment computer system.
Figure 4:
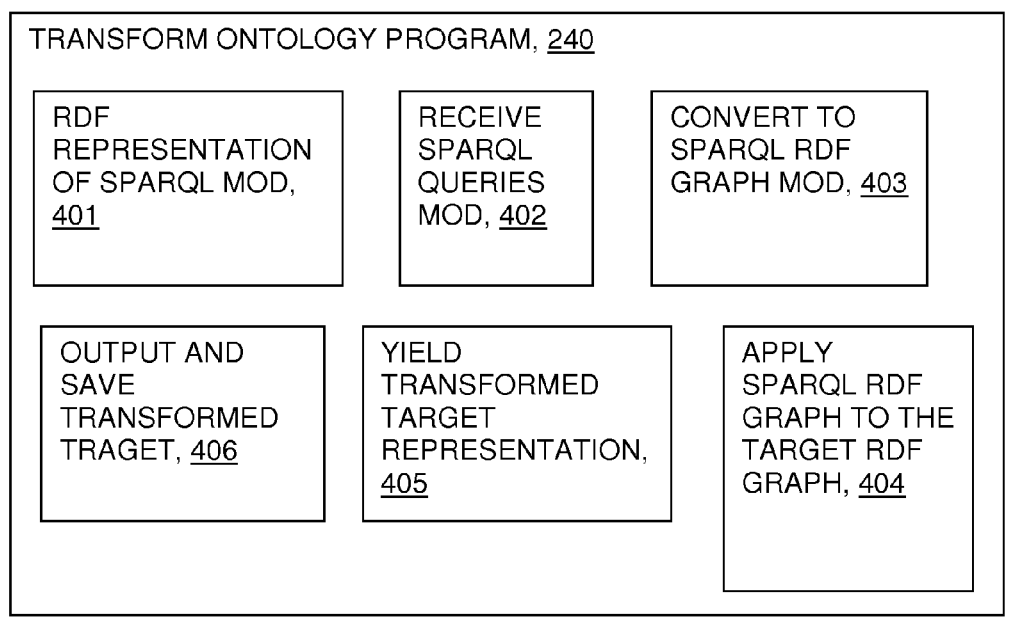
FIG. 4 is a schematic view of a portion of the first embodiment system corresponding to some software executed by the first embodiment system.

Operation of an embodiment of the present invention will now be described with reference, mostly to FIG. 3 (flowchart 300) and FIG. 4 (a block diagram of transform ontology program 240).

Processing begins at step S301 where RDF representation of SPARQL module (mod) 401 (see FIG. 4) is provided with machine readable instructions for making RDF representations of sets of queries in the SPARQL query language. Alternatively, other query languages (now known or to be developed in the future) for querying RDF graphs could be used as an alternative to SPARQL. Many details regarding how to represent the SPARQL query language, in the form and format of RDF, will be set forth, below, in the FURTHER COMMENTS AND EMBODIMENT(S) sub-section of this DETAILED DESCRIPTION section. One fundamental point is noted now with respect to step S301 as follows: while SPARQL is conventionally, and widely, used to query RDF graphs, step S301 is a fundamentally different thing because, by using the instructions of mod 401, it is queries in the SPARQL language that can be put into RDF form and format. In other words, in this step, an RDF graph is not the subject of a SPARQL query, but, rather, SPARQL, in and of itself, is the subject of an RDF graph which is created in step S301.

The machine readable instructions of mod 401 may make use of one or more of the following concepts (defined, below, in the DEFINITIONS sub-section of this DETAILED DESCRIPTION section): (i) transformation ontology/transformation definition ontology; (ii) transformation definition; (iii) transformation element; and (iv) transformation configuration.

Processing proceeds to step S302 where Receive SPARQL queries mod 402 (see FIG. 4) receives: (i) a set of SPARQL queries, including one or more (generally more than one) SPARQL queries; and (ii) a "target RDF graph" which is the RDF representation to which the queries are directed. The SPARQL queries: (i) may come from a human user (see definition in the DEFINITIONS sub-section, below, of this DETAILED DESCRIPTION section); (ii) may be generated by artificial intelligence entity(ies); and/or (iii) some combination of the foregoing alternatives. In some embodiments, the queries of the received set may be generated at one of the client sub-systems 104, 106, 108, 110, 112 (see FIG. 1).

Processing proceeds to step S303 where convert to SPARQL RDF graph mod 403 (see FIG. 4) uses the machine readable instructions of mod 401 (see FIG. 4) to convert the previously-received set of SPARQL queries into an RDF graph in RDF form and format, which will herein be referred to as the SPARQL RDF graph, and which conforms to the transformation definition ontology. The SPARQL RDF graph should not be confused with the target RDF graph received at step S302. The SPARQL RDF graph is an RDF graph made of SPARQL queries conforming to the transformation definition ontology.

Processing proceeds to step S304 where apply SPARQL RDF graph to the target RDF graph 404 (see FIG. 4) applies the previously-generated SPARQL RDF graph to the target RDF graph. At ensuing step S305, yield transformed target representation mod 405 (see FIG. 4) yields a transformed target representation that: (i) results from applying the SPARQL RDF graph to the target RDF graph at step S304; and (ii) represents information from the target RDF that is responsive to the set of queries received at step S302. Some advantages of converting the set of SPARQL queries into a SPARQL RDF graph, prior to applying the query set, will be discussed, below, in the FURTHER COMMENTS AND/OR EMBODIMENT(S) sub-section of this DETAILED DESCRIPTION section.

Processing proceeds to step S306 where output and save transformed target mod 406 outputs and saves the transformed target. More specifically, the transformed target may be in the form of an ontology or text depending upon whether the transformation is an ontology-to-ontology transformation or an ontology-to-text transformation. The output of the transformed target may take various forms, such as hard copy, screen display, email communication, etc.

III. Further Comments and/or Embodiments

Some embodiments of the present invention provide tooling that takes advantage of an ontology specification. SPARQL is currently the conventional standard way of writing queries in order to get data from RDF graphs. SPARQL version 1.1 also has update capabilities, including addition and deletion of RDF triples. Some embodiments of the present invention provide a system to convert RDF to text in a way that takes advantage of the fact that an RDF graph is based on a well-defined ontology.

In some embodiments of the present invention: (i) the software defines a way for a user to specify a network of queries and/or a partial order among these queries; (ii) there is an implicit hierarchical ordering because these queries are linked in a tree shape; and/or (iii) data from one query is passed to nested queries in the hierarchy. These embodiments allow a user to transform an entire RDF graph as one unit, rather than requiring resorting to a piecemeal approach. Some embodiments of the present invention allow for RDF to text transformation, with due accommodation of the fact that order of processing of RDF nodes is potentially important.

Some embodiments of the present invention provide: (i) a method to describe SPARQL queries; and/or (ii) method to link SPARQL queries in a tree/graph formation. The linked SPARQL queries are themselves represented using RDF, and this RDF representation of the SPARQL language corresponds to a transform ontology (see DEFINITIONS sub-section of this DETAILED DESCRIPTION section), as will be described below. Some embodiments of the present invention provide an engine that executes queries (specified as an RDF graph) as follows: (i) in depth-first ordering; and/or (ii) with the feature of passing the data from one query in the hierarchy to another query down in the hierarchy. Some embodiments of the present invention are methods to enforce partial ordering between the executing queries when such an ordering is desired or required. However, at least some embodiments will not force such ordering when such ordering is not desired or required (for example, when the author doesn't care).

In some embodiments, once the engine starts executing this specification, it comes out with the final document and will have processed elements in the order that is specified in the query. Some embodiments of the present invention can be used both for: (i) ontology-to-ontology transforms; and/or (ii) ontology-to-text transforms.

Details as to how queries and templates (for example, text templates) are linked to form a system will now be discussed. This example system is interpreted by an engine which understands this ontology. Before proceeding, the reader may want to familiarize herself with the definitions of the following terms set forth below in the DEFINITIONS sub-section of this DETAILED DESCRIPTION section: (i) transformation ontology/transformation definition ontology; (ii) transformation definition; (iii) transformation element; and (iv) transformation configuration.

In this example system, the transformation ontology for "select" is as follows:

```
tr:Select rdf:type owl:Class.
tr:selectQuery rdf:type owl:DatatypeProperty ;
rdfs:domain tr:Select ;
rdfs:range xsd:string .
```

"Select" provides a mechanism to select a set of elements, each one of which acts as a source for generating elements in target domain. Select points to a SELECT query via predicate selectQuery. In order to provide ease of use, and to be more reliably compatible with SPARQL, a Selector can return list of tuples (SELECT ?x ?y ?z). Once the SPARQL domain is available, this can be replaced by an equivalent class from that domain.

In the example system, the transformation ontology for "selector" is as follows:

```
tr:Selector rdf:type owl:Class.
tr:select rdf:type owl:DatatypeProperty ;
rdfs:range tr:Select ;
rdfs:domain tr:Selector .
tr:selector rdf:type owl:ObjectProperty ;
rdfs:range tr:Selector ;
rdfs:domain tr:Selector .
tr:constructor rdf:type owl:ObjectProperty ;
rdfs:range tr:Constructor ;
rdfs:domain tr:Selector .
```

A "selector" provides a mechanism to reuse a Select across a transformation definition. A "selector" points to a "select" via the following property: tr:select. A "selector" can point to other "selectors" and "constructors" via the following respective properties: (i) tr:selector, and (ii) tr:Constructor. A "selector" may point to one or more "selectors" and "constructors." Every element selected by the associated (with this "selector") "select," is passed on to these "selectors" and "constructors."

In the example system, the transformation ontology for "selector" is as follows:

```
tr:Construct rdf:type owl:Class .
tr:constructQuery rdf:type owl:DatatypeProperty
;
    rdfs:domain tr:Construct ;
    rdfs:range xsd:string .
```

A "constructor" provides a mechanism to capture a generation rule for generating an element in a target domain. A "constructor" points to a CONSTRUCT query, or a text template, via a predicate "constructQuery." The system can infer if a given query is a text template or an executable SPARQL CONSTRUCT query. The "tr:constructQuery" can be specified to have a range different than text (for example RDF representation of SPARQL), if such a range is desired or required.

In the example system, the transformation ontology for a "constructor" is as follows:

```
tr:Constructor rdf:type owl:Class ;
    rdfs:subClassOf tr:Transform_Domain_Entity .
tr:construct rdf:type owl:ObjectProperty ;
    rdfs:range tr:Construct ;
    rdfs:domain tr:Constructor .
```

A "constructor" provides a mechanism to reuse a "construct" across a transformation definition. A "constructor" points to a "construct" via the following property: tr:construct.

In the example system, the transformation ontology for the relation "dependsOn" is as follows:

```
tr:dependsOn rdf:type owl:ObjectProperty ;
    rdfs:range :Selector ;
    rdfs:domain :Selector ;
    rdfs:subPropertyOf tr:hasPrerequisite . tr:hasPrerequisite rdf:type owl:ObjectProperty ,
    owl:TransitiveProperty
.
```

A "selector" can be dependent upon another "selector." This dependence is captured by the following predicate: tr:dependsOn. The predicate tr:dependsOn is a "subPropertyOf" tr:hasPrerequisite. The property tr:hasPrerequisite is a transitive property.

A "constructor" does not participate in the "dependsOn" relation. For any "selector," the initial element to get executed, by default, would be some "constructor." For this reason, there is no need for an explicit "dependsOn" from a "selector," to a sibling "constructor." In that case, the transformation engine would imply the "dependsOn" relation. In this example system, one constraints enforced upon the usage of the "dependsOn" relation is that "dependsOn" can exist only between two instances of "selector" which have the same instance of "selector" referring to these two elements as follows:

```
SELECT ?Selector1 ?Selector2
WHERE {
    ?Selector tr:selector ?Selector1.
    ?Selector1 tr:dependsOn ?Selector2.
    FILTER NOT EXISTS { ?aSelector tr:selector ?Selector2. }
}
```

In this example system, another constraint enforced upon the usage of "dependsOn" is that the "dependsOn" relation should not give any values for ?Selector1 and/or ?Selector2.

The "tr:dependsOn" mechanism provides a way to implement partial ordering between various queries being executed. The "tr:dependsOn" mechanism gives a user a way to: (i) define a ordering where desired or required; but, alternatively (ii) leave it to the system where not desired or required.

In the example system, the transformation ontology for "root" is as follows:

```
:Root rdf:type owl :Class ;
    rdfs:subClassOf
        :Transform_Domain_Entity .
```

"Root" marks the root of node of a Transformation Graph. This is the point from where the Transformation Engine should start the execution of various Transformation Elements. Root also refers to the transformation version as follows:

```
:version rdf:type owl:DatatypeProperty ;
    rdfs:domain :Root ;
    rdfs:range xsd:string .
```

In the example system, the transformation ontology for "PropertyDefinition" is as follows:

```
:PropertyDefinition rdf:type owl :Class ;
    rdfs:subClassOf
        :Transform_Domain_Entity .
```

A Transformation author can define additional properties for a "root." Accordingly, "PropertyDefinition" holds information regarding Property's name, defaultValue, type, and description as shown in the following example:

```
:propertyName rdf:type owl:DatatypeProperty ;
    rdfs:domain :PropertyDefinition ;
    rdfs:range xsd:string.
:propertyDefaultValue rdf:type
    owl:DatatypeProperty ;
    rdfs:domain :PropertyDefinition ;
    rdfs:range xsd:string.
:propertyType rdf:type owl:DatatypeProperty ;
    rdfs:domain :PropertyDefinition ;
    rdfs:range xsd:string.
:propertyDescription rdf:type
    owl:DatatypeProperty ;
    rdfs:domain :PropertyDefinition ;
    rdfs:range xsd:string.
```

In this example system, the way in which a transform takes place will now be discussed. The Transformation Execution Engine Specifications will now be identified in the following paragraphs.

The Transformation Engine starts from an instance of Transformation Configuration. It creates initial context using property-value pairs defined in the configuration.

The Transformation Engine navigates to the "root" element of the corresponding Transformation Definition. Then the Transformation Engine navigates to "rootSelectors."

The Transformation Engine executes the SELECT query of the "select" corresponding to the "selector" in order to obtain a Collection of Selected Elements.

The Transformation Engine passes on the selected elements, one by one, to the "constructor"/"selector" pointed to by this "selector." The Transformation Engine repeats this process for all referenced "constructors"/"selectors" with this "selector." The "constructor" related to this "selector" is executed first. All other related "selectors" can be executed in any order, or in parallel, unless there is a "dependsOn" relation between any two elements. All related "selectors" having a "dependsOn" relation have to be executed in the order derived from "dependsOn" relation(s).

A concrete example of the foregoing will now be discussed. This example involves a subset of a UML-to-UML Transformation (UML stands for Unified Modeling Language). A portion of this transformation deals with transforming: (i) a Package into a Package; and (ii) a Class into a Class. This concrete example is a scaled down version to keep things simple for pedagogical purposes. This concrete example begins with a Hierarchical Transformation Definition. The transformation definition is influenced by the hierarchical characteristics of the source ontology. For example, a Class occurs as a "packagedElement" of a Package. For this reason, the transformation rule for a Class gets nested inside of the transformation rule for a Package. Also, a Package can also occur as a "packagedElement" of another Package. For this reason, a transformation rule for a Package may refer to itself in a recursive manner.

Figure 5:
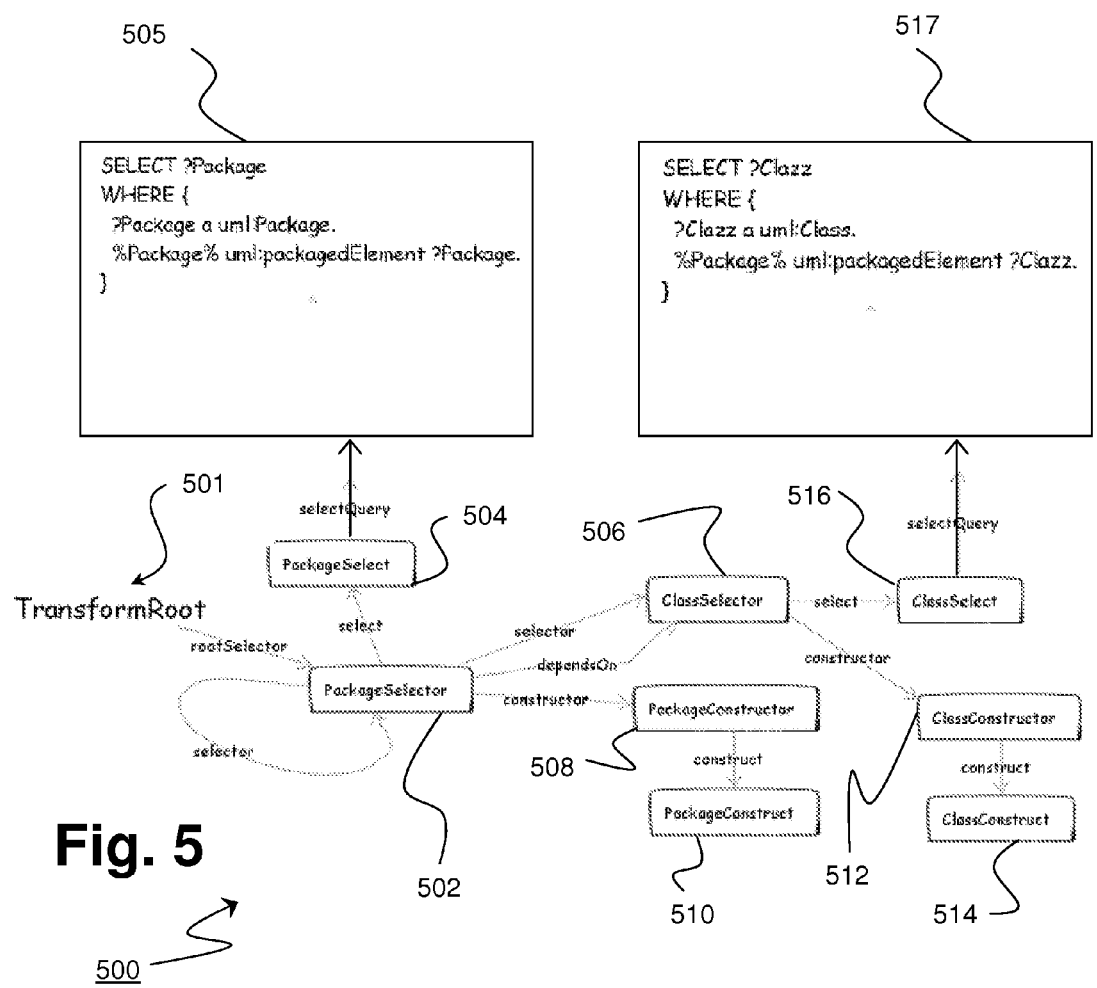
FIG. 5 is a diagram of an RDF representation of a set of SPARQL queries.

A Transformation Definition created in this style is shown in diagram 500 of FIG. 5. As shown in FIG. 5, diagram 500 includes: TransformRoot 501; PackageSelector block 502; PackageSelect block 504; first SPARQL statement 505; ClassSelector block 506; PackageConstructor block 508; PackageConstruct block 510; ClassConstructor block 512; ClassConstruct block 514; ClassSelect block 516; and second SPARQL statement 517.

Transformation Definition starts with TransformRoot 501. The arrow representing (and labeled as) the "rootSelector" points to PackageSelector block 502. The arrow representing (and labeled as) "select" points to PackageSelect block 504. PackageSelect block 504 represents a SPARQL query used to select a Package contained in the root package called % Package %. %Package% is the initial source for the transformation. Subsequently, % Package % is a selected Package that acts as a parent for next level of Package. Also, emanating from PackageSelector block 502 are: (i) a "constructor" arrow leading PackageConstructor block 508; (ii) a "dependsOn" arrow leading to ClassSelector block 506; (iii) a "selector" arrow leading to ClassSelector block 506; and (iv) a recursive "selector" arrow pointing back to PackageSelector block 502.

The flow is as follows:
i) Select a Package, and construct a target for it.
ii) Select Classes from this Package. Construct a target for each of these Classes. This cannot happen before step i) because (implicitly) PackageConstructor has to be executed before ClassSelector.
iii) Select Packages from this Package. Construct a target for each of these Packages. This cannot happen before step i) because (implicitly) PackageConstructor has to be executed before PackageSelector.

Some embodiments of the present invention provide a method to link SPARQL queries in a tree/graph formation. These hierarchically linked SPARQL queries are themselves represented using RDF and this RDF corresponds to the transform ontology discussed above. Some embodiments of the present invention provide a method to: (i) enforce partial ordering between the executing queries when such an ordering is required or desired; but (ii) not force ordering when not desired or required (for example, the author doesn't care). Some embodiments of the present invention provide a method to transform recursively nested elements. For example, packages containing packages: (i) may be recursively nested up to any level of nesting; and (ii) have an ordering in which the transforms are applied. Some embodiments of the present invention provide an engine which executes these queries as explained above, with: (i) in-depth first ordering; and (ii) passing the data from one query in the hierarchy to another query down in the hierarchy. The context for an executing query is provided by its parents and other related parents.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

user: includes, but is not necessarily limited to, the following: (i) a single individual human; (ii) an artificial intelligence entity with sufficient intelligence to act as a user; and/or (iii) a group of related users.

Transformation ontology/transform definition ontology: an ontology describing the domain of transforms, itself; this can also be thought of as a transformation metamodel; going by the RDF philosophy of describing RDF, itself, using RDF, transform domain concepts are described with a dedicated ontology; this dedicated ontology is herein called the "transform definition ontology" or "transform ontology."

Transformation definition: An instance of a transformation ontology; this model specifies the rules for deriving elements of a target ontology from a source ontology; elements of this model are type of elements defined in transformation ontology; this is itself represented as an RDF graph.

Transformation element: Any element in a transformation definition; there are at least two kinds of transformation elements as follows: (a) elements aiding in selection of source elements to be transformed: "selectors" and "selects" (a "select" represents a SELECT query, that can be shared among multiple "selectors"), and (b) elements aiding in construction of target elements: "constructors" and "constructs" (a "construct" represents a CONSTRUCT query, that can be shared among multiple "constructs," and a "construct" could also represent a template text which is the output in case one is transforming from ontology to text).

Transformation configuration: A configuration with specific parameters filled in, such as a transformation definition, version to be used, location from which source elements are picked up, and location to which target elements are generated.

RDF query language: any language suitable for writing machine readable queries directed to an RDF graph; RDF query languages include, but are not necessarily limited to, the following: SPARQL.

What is claimed is:

1. A system comprising:
a set of processor(s); and
a storage device configured to store machine executable program instructions;
wherein:
the set of processor(s) and the storage device are operatively connected so that the set of processor(s) executes the machine executable program instructions;
the machine executable program instructions include:
first program instructions programmed to receive, by a transformation engine, a machine readable input data set corresponding to a Resource Description Framework (RDF) graph which is arranged as a hierarchy nodes having a plurality of ordered levels, with the order of the levels of the plurality of levels running from a root node level to a lowest node level,
second program instructions programmed to traverse, using a transformation engine, the nodes of the RDF graph, starting at the root node and proceeding through the other nodes in a depth first order, so that at each node of the RDF graph, a transformation engine performs the following operations:
selecting, using a package selectQuery, included in the transformation engine, a set of package(s) of the current node included in the current node being traversed,
for each package of the set of package(s) of the current node, constructing, using a package constructor included in the transformation engine, a target for the package,
for each package of the set of package(s) of the current node, selecting, using a class selectQuery included in the transformation engine, a set of class(es) of the current package of the current node, and
for each class of each set of classes of each package of the set of package(s) of the current node, constructing, using a class constructor included in the transformation engine, a target for the class, and
third program instructions programmed to assemble, based upon content of the RDF graph, targets for the packages included in the RDF graph and targets for the classes included in the RDF graph, an alternative presentation for the content of the RDF graph, with the alternative presentation taking the form of a text based presentation.

2. The system of claim 1 wherein:
the package selectQuery is a SPARQL query; and
the class selectQuery is a SPARQL query.

3. The system of claim 2 wherein the package selectQuery has the following form and format:
SELECT ?Package
WHERE {
　?Package a :Package
　% Package % :packagedElement ?Package
}.

4. The system of claim 2 wherein the class selectQuery has the following form and format:
SELECT ?Clazz
WHERE {
　?Class a:Class
　% Package %:packagedElement ?Class
}.

5. A system comprising:
a set of processor(s); and
a storage device configured to store machine executable program instructions;
wherein:
the set of processor(s) and the storage device are operatively connected so that the set of processor(s) executes the machine executable program instructions;
the machine executable program instructions include:
first program instructions programmed to receive, by a transformation engine, a machine readable input data set corresponding to a Resource Description Framework (RDF) graph which is arranged as a hierarchy nodes having a plurality of ordered levels, with the order of the levels of the plurality of levels running from a root node level to a lowest node level,
second program instructions programmed to traverse, using a transformation engine, the nodes of the RDF graph, starting at the root node and proceeding through the other nodes in a depth first order, so that at each node of the RDF graph, a transformation engine performs the following operations:
selecting, using a package selectQuery, included in the transformation engine, a set of package(s) of the current node included in the current node being traversed,
for each package of the set of package(s) of the current node, constructing, using a package constructor included in the transformation engine, a target for the package,
for each package of the set of package(s) of the current node, selecting, using a class selectQuery included in the transformation engine, a set of class(es) of the current package of the current node, and
for each class of each set of classes of each package of the set of package(s) of the current node, constructing, using a class constructor included in the transformation engine, a target for the class, and
third program instructions programmed to assemble, based upon content of the RDF graph, targets for the packages included in the RDF graph and targets for the classes included in the RDF graph, an alternative presentation for the content of the RDF graph, with the alternative presentation taking the form of a non-RDF graph presentation.

6. The system of claim 5 wherein:
the package selectQuery is a SPARQL query; and
the class selectQuery is a SPARQL query.

7. The system of claim 6 wherein the package selectQuery has the following form and format:
SELECT ?Package
WHERE {
　?Package a:Package
　% Package % :packagedElement ?Package
}.

8. The system of claim 6 wherein the class selectQuery has the following form and format:

```
SELECT ?Clazz
WHERE {
    ?Class a:Class
    % Package %:packagedElement ?Clazz
}.
```

9. A computer program product comprising:

a non-transitory storage device configured to store machine executable program instructions; and program instructions stored in or on the non-transitory storage device, the program instructions comprising:

first program instructions programmed to receive, by a transformation engine, a machine readable input data set corresponding to a Resource Description Framework (RDF) graph which is arranged as a hierarchy nodes having a plurality of ordered levels, with the order of the levels of the plurality of levels running from a root node level to a lowest node level, second program instructions programmed to traverse, using a transformation engine, the nodes of the RDF graph, starting at the root node and proceeding through the other nodes in a depth first order, so that at each node of the RDF graph, a transformation engine performs the following operations:

selecting, using a package selectQuery, included in the transformation engine, a set of package(s) of the current node included in the current node being traversed, for each package of the set of package(s) of the current node, constructing, using a package constructor included in the transformation engine, a target for the package, for each package of the set of package(s) of the current node, selecting, using a class selectQuery included in the transformation engine, a set of class(es) of the current package of the current node, and for each class of each set of classes of each package of the set of package(s) of the current node, constructing, using a class constructor included in the transformation engine, a target for the class, and third program instructions programmed to assemble, based upon content of the RDF graph, targets for the packages included in the RDF graph and targets for the classes included in the RDF graph, an alternative presentation for the content of the RDF graph, with the alternative presentation taking one of the following forms: a text based presentation or a non-RDF graph presentation.

10. The computer program product of claim 9 wherein:

the package selectQuery is a SPARQL query; and the class selectQuery is a SPARQL query.

11. The computer program product of claim 10 wherein the package selectQuery has the following form and format:

```
SELECT ?Package
WHERE {
    ?Package a:Package
    % Package %:packagedElement ?Package
}.
```

12. The computer program product of claim 10 wherein the class selectQuery has the following form and format:

```
SELECT ?Clazz
WHERE {
    ?Class a:Class
    % Package %:packagedElement ?Clazz
}.
```

* * * * *